(12) United States Patent
Schlatterbeck (10) Patent No.: US 10,987,962 B2
(45) Date of Patent: Apr. 27, 2021

(54) PRODUCTION OF POLYMERIC PARTICLES AND ROUGH COATINGS BY INK JET PRINTING

(71) Applicant: ACTEGA Schmid Rhyner AG, Adliswil-Zuerich (CH)

(72) Inventor: Dirk Schlatterbeck, Friltschen (CH)

(73) Assignee: ACTEGA Schmid Rhyner AG, Adliswil-Zuerich (CH)

( * ) Notice: Subject to any disclaimer, the term of this patent is extended or adjusted under 35 U.S.C. 154(b) by 340 days.

(21) Appl. No.: 15/151,146

(22) Filed: May 10, 2016

(65) Prior Publication Data
US 2016/0250877 A1    Sep. 1, 2016

Related U.S. Application Data

(63) Continuation of application No. PCT/EP2014/074287, filed on Nov. 11, 2014.

(30) Foreign Application Priority Data

Nov. 12, 2013  (DE) .................... 10 2013 112 404.6

(51) Int. Cl.
*B41M 5/50* (2006.01)
*B05D 5/02* (2006.01)
(Continued)

(52) U.S. Cl.
CPC ............. *B41M 5/502* (2013.01); *B05D 5/02* (2013.01); *B41J 2/01* (2013.01); *B41J 11/0015* (2013.01)

(58) Field of Classification Search
CPC ... B41M 5/502; B05D 5/02; B41J 2/01; B41J 11/0015
See application file for complete search history.

(56) References Cited

U.S. PATENT DOCUMENTS

| | | | |
|---|---|---|---|
| 5,059,266 A | 10/1991 | Yamane et al. | |
| 6,849,308 B1 * | 2/2005 | Speakman | G03F 7/16 427/422 |

(Continued)

FOREIGN PATENT DOCUMENTS

| | | |
|---|---|---|
| CN | 1721170 A | 1/2006 |
| DE | 100 45 994 A1 | 4/2002 |

(Continued)

OTHER PUBLICATIONS

English machine translation of the specification of JP 2007-260573.*

(Continued)

*Primary Examiner* — Robert S Walters, Jr.
(74) *Attorney, Agent, or Firm* — Walter Ottesen, P.A.

(57) ABSTRACT

A method for producing polymer particles is disclosed in which a fluid preparation is ejected in drop form from a nozzle of an ink jet print head. At least one nozzle ejects droplets in response to electrical signals, and radiation from a radiation source is directed on the droplets in flight, whereby the fluid preparation is at least partially cured by irradiation, so that particles are obtained from the fluid drops before impact or collection. The fluid preparation contains a prepolymer, an oligomer, monomers, or reactive diluents as well as at least one photoinitiator. The fluid preparation has a polymerizable group that is radically polymerizable. Further, a printed product and a device for making the printed product are disclosed. The printed product has a rough polymeric coating that is composed of spherical or largely spherically shaped polymer particles.

15 Claims, 3 Drawing Sheets

(51) Int. Cl.
  *B41J 2/01*    (2006.01)
  *B41J 11/00*   (2006.01)

(56) References Cited

U.S. PATENT DOCUMENTS

| | | |
|---|---|---|
| 7,222,952 B2 | 5/2007 | Uejima |
| 7,927,669 B2 | 4/2011 | Schlatterbeck et al. |
| 2006/0012058 A1 | 1/2006 | Hasei |
| 2008/0102122 A1 | 5/2008 | Mahadevan et al. |
| 2012/0269983 A1 | 10/2012 | Grinberg et al. |
| 2014/0010855 A1 | 1/2014 | Mahadevan et al. |

FOREIGN PATENT DOCUMENTS

| | | |
|---|---|---|
| DE | 698 22 201 T2 | 7/2004 |
| DE | 10 2010 063 982 A1 | 6/2012 |
| EP | 1 037 716 B1 | 9/2000 |
| JP | S5678660 A | 6/1981 |
| JP | H02307731 A | 12/1990 |
| JP | H0365345 A | 3/1991 |
| JP | 2003103674 A | 4/2003 |
| JP | 2004341167 A | 12/2004 |
| JP | 2005212445 A | 8/2005 |
| JP | 2006315289 A | 11/2006 |
| JP | 2007260573 A | 10/2007 |
| JP | 2012187895 A | 10/2012 |
| WO | 2012/049428 A2 | 4/2012 |

OTHER PUBLICATIONS

International Preliminary Report on Patentability and Written Opinion of the International Searching Authority dated May 17, 2016 of international application PCT/EP2014/074287 on which this application is based.

International Search Report dated Mar. 31, 2015 of international application PCT/EP2014/074287 on which this application is based.

* cited by examiner

PRODUCTION OF POLYMERIC PARTICLES AND ROUGH COATINGS BY INK JET PRINTING

CROSS REFERENCE TO RELATED APPLICATIONS

This application is a continuation application of international patent application PCT/EP2014/074287, filed Nov. 11, 2014, designating the United States and claiming priority from German application 10 2013 112 404.6, filed Nov. 12, 2013, and the entire content of both applications is incorporated herein by reference.

FIELD OF THE INVENTION

The invention generally concerns a method for producing polymer particles and polymeric structures composed of thermoplastics and/or elastomers and/or duromers, referred to in the following as particles or polymer particles. In particular, the invention concerns a method for producing rough polymeric coatings, a printed product comprising a substrate or carrier material with at least one rough polymeric coating, and a corresponding device for producing rough polymeric coatings on a substrate or carrier material.

BACKGROUND OF THE INVENTION

Methods for producing three-dimensional structures on a substrate using a print head are known from the prior art. Particles or particle-containing solutions are used in these methods.

United States patent application publication 2012/0269983 describes a method in which, for example, pigments or glitter, metallic particles, or glass particles are applied to a substrate. To guarantee adhesion of the particles, the substrate has a curable coating on which the particles are cured after application. In the method described, an adhesive is partially applied to the substrate, and the particles are then scattered onto the substrate. In a following step, the adhesive is cured, and lastly, the excess particles not located in the area of adhesive coating are suctioned off or removed in another manner.

DE 102010063982A1 describes a method for producing three-dimensional structures on a substrate in which a solution with particles is ejected from a nozzle opening onto a substrate. The majority of the solvent used evaporates in flight, so that a three-dimensional structure forms for each droplet during flight. The method takes advantage of the ordinarily undesired effect which results, with corresponding activation of drop-on-demand (DOD) ink jet heads, in the production of satellite droplets in addition to the desired droplets. In extreme cases, activation can be carried out in such a way that only small satellite droplets are formed. This makes it possible to produce substantially smaller droplet masses than those which would correspond to the nozzle diameter of the DOD ink jet head used. Because of their size, these droplets have a particularly high vapor pressure, which helps to achieve the objective of drying during flight.

Examples of coating preparations used include colloidal inks with highly monodisperse organic polystyrene microspheres or inorganic polystyrene microspheres, or alternatively, inorganic silica microspheres, that is, highly specialized coating agents. The selection of coating agents for the object described in DE 102010063982A1 is therefore highly restricted.

In the method described, evaporation of the solvent during droplet flight causes self-organization of the microparticles within the droplets into crystalline spherical aggregates.

The purpose of the method is also, by means of the aggregates formed in flight, to allow the production of aggregated, three-dimensional structures having special photonic properties using a simple and economical method according to the "dry self-assembly" method without having to depend on special highly hydrophobic substrates and the like.

GB 2233928B and U.S. Pat. No. 5,059,266 describe a 3-D printing process for producing three-dimensional objects using UV-curable inks of various colors or having various polymer properties. The method takes advantage of (partial) curing of the droplets in flight to prevent mixing of the colors with one another, as the precured droplets have extremely high viscosity or are even solid.

A further configuration of the printing method concerns the placement of the ink jet machine in a housing that can be completely operated in an inert gas atmosphere by means of evacuation and subsequent filling with inert gas, thus preventing the problem inherent in radical polymerization of unsaturated acrylate compounds referred to as oxygen inhibition. Oxygen possesses the property of interrupting the radical chain reaction by accumulating on the reactive radical and thus preventing or at least hindering complete polymerization. Even if this inhibition can be suppressed by means of suitable additives, it is nevertheless more favorable from an energy standpoint to prevent it using an inert gas atmosphere. In addition, this obviates the need for the aforementioned additives.

In DE 102010063982A1, in which production of the crystalline array is significant, the optical properties of the microcrystals in particular are utilized, while mechanical and esthetic properties or other functional properties do not play a role. GB 2233928 B and U.S. Pat. No. 5,059,266 pertain to the achievement of a three-dimensional shape rather than coatings per se.

In the use of coatings in general, the aim is to achieve the widest possible variety of material and surface properties and functions. In the case of fluid coating agents, both fluid and solid components can be used for this purpose. Here, solid components are used for a wide range of purposes. For example, solids can be used in order to achieve a matted coating or to influence surface properties such as sliding friction. A drawback of this method is that the particles are homogenously distributed in the coating material and therefore cannot specifically be applied to the surface. Particles may also be contained in coatings in order to influence the mechanical properties of the coating. As an example, particles can be added to coatings in order to improve the scratch resistance thereof. The use of pigments is also common. Moreover, the conductivity of magnetic properties of coatings can also be affected by the use of particles. Materials representing all the above-mentioned particle types exert their action based on a specified particle size, with the result that they cannot be produced in any desired small size.

In using ink jets, there are limits on the use of particles due to the small jet diameter, which is in the micron range. Excessively large particles can block the nozzles and thus potentially destroy the ink jet head. In addition to this risk, particles having diameters larger than the nozzle diameter cannot be processed by ink jet methods.

EP 1037716B1 or DE 69822201T2 concern layered structures produced using controlled droplets and methods for the production thereof.

SUMMARY OF THE INVENTION

The invention presented here concerns polymer particles and coatings that are produced from fluid preparations using ink jet technology.

The method according to the invention achieves the object of making application of particles using ink jet technology possible. It takes advantage of the property of ink jet technology that allows the particles to be applied in a temporally and spatially targeted manner by digital activation of the nozzles.

A further advantage of ink jet technology for the production of particles according to the invention lies in the flexibility of the method with respect to the particle size. Not only can a targeted effect on droplet size and positional accuracy be achieved by appropriately selecting the print heads with respect to nozzle size and achievable resolution, but droplet size can be adjusted over a wide range by influencing nozzle control, even in areas that are substantially smaller than the specified droplet size of a head, by taking advantage of the method disclosed in DE 102010063982A1 and activating the heads with a signal that is unsuitable for individual drops.

In the method according to the invention, the fluid preparations for processing with ink jet nozzles should preferably be free of solids. The particles are therefore produced in situ, as it were. Clogging of the nozzle opening is prevented because of the absence of solid content. This makes it possible to obtain particles in sizes larger than those achieved in the use of dispersions. In situ production of the particles is advantageous in that, for example, obviates the need for a corresponding matrix or the use of added binders and/or excipients for stabilizing the particles in the corresponding fluid preparation.

An object of the present invention is to provide a method for producing polymer particles using an ink jet print head.

In particular, the use of this process makes it possible to apply rough polymer coatings to substrates. Specifically, the term "rough coating" is to be understood as referring to a coating whose surface is uneven or textured. Such coatings are referred to in the literature as textured lacquers. A further object of the invention is to provide a device for the coating of substrates with rough polymeric coatings by means of ink jet printing and to produce substrates having rough polymeric coatings.

The object is achieved by the method and device described herein.

In the method provided according to the invention for producing polymer particles, a fluid preparation for processing with ink jet nozzles is ejected from the nozzles by means of an ink jet print head in the form of droplets, which are at least partially cured in flight by irradiation, so that on impact or collection, polymer particles are obtained from the fluid droplets. The ink jet print head has at least one nozzle through which the fluid preparation for processing with ink jet nozzles is ejected in the form of fluid droplets in response to electrical signals.

In particular, this process makes it possible to obtain spherical or largely spherically-formed polymer particles from the fluid droplets before impact or collection on a substrate or carrier material.

Curing is carried out by polymerization and/or crosslinking reactions. The fluid preparation according to the invention comprises at least one prepolymer and/or monomer that has at least one polymerizable group. In this case, the polymerizable group is radically polymerizable and/or crosslinkable. In particular, the fluid preparation for processing with ink jet nozzles comprises, for example, a solution of at least one prepolymer and/or oligomer in at least one monomer and/or reactive diluent.

Moreover, the fluid preparation for processing with ink jet nozzles contains at least one photoinitiator, with the term photoinitiator being understood to refer both to a photoinitiator and to a photosensitizer and/or a synergist.

Using a radiation source, radiation is directed onto the droplets in flight by means of a radiation source. Electron beam curing is also conceivable.

The photoinitiator and wavelength of the radiation in curing with radiation in the UV or VIS range are coordinated with each other in such a way that the photoinitiator, under influence of the radiation, triggers radical polymerization and/or crosslinking of the polymerizable groups in the prepolymers and/or monomers.

According to an embodiment, the fluid preparation for processing with ink jet nozzles contains prepolymers and/or monomers having at least two polymerizable groups per prepolymer chain or monomer. This is particularly advantageous with respect to crosslinking of the individual polymer chains.

Using an ink jet print head and curing the fluid preparation for processing with ink jet nozzles in droplet form during flight makes it possible to use corresponding fluid preparations with low viscosities, which is particularly advantageous with respect to processability. Moreover, formation of the particles is governed by the process parameters, in particular by the ejection conditions of the print head used and curing of the particles during flight, so that one can dispense for example with self-organizing or particulate components in the fluid preparations for use with ink jet nozzles. This makes a large selection of suitable prepolymers and monomers available.

By means of the effect according to the invention of irradiating the droplets in flight, the individual droplets are at least partially cured, with curing progressing from the fluid state via a gel or sol/gel state to the solid state. The achievable state depends, among other factors, on the UV dose. In one possibility, curing can be carried out either by targeted use of oxygen inhibition to cure the droplets on a volume basis, with the droplets retaining their adhesive properties on the surface. Alternatively, the wavelength of the UV light used can be adjusted in combination with photoinitiators and optionally UV absorbers in order to cure the surface only. Of course, complete surface hardening and full hardening can also be achieved by suitably selecting the components and the UV radiation source. Curing ensures dimensional stability so that polymer particles are obtained.

According to a further aspect of the invention, the method also uses inorganic or hybrid polymer fluids as ink jet fluid or components of the ink jet fluid. In this manner, corresponding inorganic or hybrid polymer particles in loose form or as a rough coating can be produced analogously to the sol/gel method. In this case, curing takes place in flight instead of radiation-induced crosslinking and/or polymerization by evaporation of a solvent. Radiation-induced crosslinking and/or polymerization can also be carried out in this embodiment by adding suitable formulation components.

In the following, rather than the above-described curing by evaporation of a solvent, the curing according to the invention by means of polymerization and/or crosslinking reactions will be discussed.

Depending on the UV dose applied, the particles obtained can be either completely or partially cured. Here, a higher degree of polymerization and/or crosslinking within the droplets results in a higher degree of curing. Thus, increasing the degree of curing increases viscosity.

According to an embodiment, particles obtained are primarily cured in the marginal areas or the areas close to the surface, while in preparation for processing with ink jet nozzles in the interior of the particles, the particles retain fluid properties and/or show lower viscosity than in the marginal areas. In this context, the droplet form has been found to be particularly advantageous for homogeneous curing from the marginal areas to the middle of the droplet and allows controlled curing. Thus, in the method according to the invention, the degree of curing and thus particle properties such as dimensional stability or adhesiveness can be determined by selection of the individual process parameters such as flight time, the volume of the ejected droplets, or the intensity and wavelength of the incident radiation. The degree of curing can also be influenced by means of the components of the fluid preparation for processing with ink jet nozzles used and the composition thereof. This makes it possible to obtain polymer particles with individually tailored properties.

According to an embodiment of the invention, the particles therefore show differing degrees of local curing. For example, this allows the degree of curing at the particle surface or in areas close to the surface to be higher than in the interior of the particles.

In particular, a radiation source is used for curing that emits light in the UV-VIS range. One embodiment of the invention provides for the use of light in the UV range. The use of LED or laser radiation sources makes it possible, using monochromatic beams or beams having a very narrow wavelength range, to conduct curing with a range that can be adjusted over a broad spectrum. Thus it is possible to more selectively control the curing of the droplets compared to other UV curable materials in the environment or even on the substrate or carrier material so that either the droplets are cured into polymer particles or the coating on the substrate or carrier material is (pre)cured, therefore achieving a variety of effects with respect to the resulting surface properties.

An embodiment of the invention comprises irradiation with light having a wavelength in the range of 150 to 700 nm, and preferably a wavelength in the range of 200 to 500 nm. Selection of the incident wavelength ranges (or the photoinitiators sensitive to these wavelength ranges) makes it possible to exert an influence on whether the droplets are cured primarily in the marginal areas or the extent to which curing takes place in the interior of a droplet, as the penetration depth of the light correlates with its wavelength.

According to a further embodiment of the invention, irradiation is conducted using light having a wavelength in the range of 350 to 700 nm. In this case, irradiation with long-wavelength light is particularly advantageous in cases where the droplets are also to be cured in the interior during flight, as deep penetration depths can be achieved in the aforementioned wavelength ranges, so that curing of the fluid preparation for use with ink jet nozzles can take place in the interior of the droplet. Optionally, previously or subsequently applied layers of particles can be selectively cured in this manner if the materials of the layer and the particles are sensitive to different wavelengths.

Moreover, the use of longer-wavelength light in application of fluid preparations containing dyes can be advantageous, as longer-wavelength light is usually absorbed from the dyes to a lesser degree than shorter-wavelength light. In general, the wavelength of the light used for curing can be adapted to the absorption properties of the dyes contained in the fluid preparation in such a way that a portion of the incident light sufficient for curing is transmitted.

Collection can take place according to an embodiment of the invention in such a way, for example, in a suitable container, that loose polymer particles not bonded to one another are obtained. The surface tension causes these polymer particles to be round to spherical. In contrast to particles produced by micronization (for example, spray micronization or milling processes) the particles producible according to the invention are characterized by extremely narrow and homogeneous size distribution.

In the case of reference to a certain Gaussian distribution, for example, with a broad dispersion and characterization, for example by $D_{50}$ and/or $D_{99}$ values, particle size is determined by the type of particle production according to the invention. Particle size should ideally be determined (optimum droplet formation process without satellites) from the parameters set in the ink jet process. However, it is also possible, by varying parameters such as pulse form and amplitude, to achieve a targeted desired size distribution. A suitable activation method, as discussed above, is described in DE 102010063982A1.

Such polymer microspheres offer a large number of possible applications, for example, micro-optics, diffracting or reflecting elements, additives, particularly coating agents, fillers or lubricants, and even as pigments. The round shape of the particles can also be highly advantageous in cases where the particles are applied as a coating to a substrate or carrier material. A possible application in this case is a reflector coating. In this case, the microspheres reflect incident light back in the direction it came from.

As a further process step according to this embodiment of the invention, a coating containing the particles may be produced.

According to a preferred embodiment of the production method according to the invention, rough coatings can also be directly produced by ink jet printing on a substrate or carrier material.

These rough coatings will be referred to below as first coatings. In other words, the first coating printed out is the coating obtained using the applied fluid preparation for processing with ink jet nozzles. Here, the terms "first" and "second" coating serve as semantic distinctions to differentiate the various coatings, but do not characterize the sequence in which the respective coatings are applied to a multiply coated substrate or carrier material. For example, a substrate or carrier material coated according to the invention may also comprise only a first coating.

The corresponding production method comprises at least process steps a) to c), which are explained in further detail below.

In step a), the fluid preparation for processing with ink jet nozzles and a substrate or carrier material are first prepared. In particular, the substrate or carrier material is a printable and/or printed substrate or a corresponding carrier material. As substrate or carrier materials, printing media such as paper products or plastic films can be used, but not exclusively. When substrates are mentioned below, therefore, this also alternatively refers to carrier materials. The use of glass or metallic substrates, as well as wood or plastic in film or plate form, for example, materials used in furniture construction or for floor coverings, is also possible. The substrates may be either flexible or rigid.

The following step b) involves dosed release of the fluid preparation for processing with ink jet nozzles from the print head, with the substrate or portions of the substrate being located below the print head and there being a space between the substrate and the print head. The print head releases the corresponding fluid preparation in the form of individual fluid droplets separated from one another.

In step c), the droplets fall for the duration of their flight from the print head to the substrate at an interval from the print head. By means of a radiation source, radiation, particularly ultraviolet radiation and/or radiation in the visible spectral range (UV-VIS range), is applied in the gap between the print head and the substrate so that the droplets are at least partially cured in flight by the effect of the radiation.

The at least partially cured droplets or the polymer particles obtained in this way, after completing the flight mentioned in step d), strike the substrate and form a rough and/or textured or uneven coating. This coating may be dull, have a particular feel (such as a sand effect, et cetera), may be particularly slideable, or particularly unslideable (for example, an anti-slippage coating), but it may also be visually functionalized (such as with color splashes, highlights, or Metallur pigments).

Among the advantages of applying the particles according to the invention to achieve surface effects is that the particles have a targeted effect on the surface and are not present in an amount exceeding the volume of the coating agent in the entire layer, and only a small portion of the concentration exerts its effect on the surface.

In this case, the adhesion of the coating to the substrate and of the particles to one another is determined in particular by the form and adhesiveness of the particles and of the surface or an optionally present coating of the substrate.

The term "adhesiveness" within the meaning of the invention is understood to refer to the adhesion capacity of the particles. Adhesiveness affects both adhesion of the particles within the coating and adhesion of the particles, and thus the coating, to the substrate. These properties are described, for example, in the area of pressure-sensitive adhesives (PSA) under the term "dynamic adhesion". Adhesiveness is determined in particular by the degree of curing at the surface of the particles. In this case, a high degree of curing at the particle surface or in the areas of the particles close to the surface results in comparatively lower adhesiveness of the particles.

The intensity of the radiation emitted by the radiation source used affects the degree of curing, with a high radiation intensity producing a high degree of curing.

According to an embodiment, the rough coating on the substrate is applied in a laterally textured manner. In this method, one can provide in a targeted manner only partial areas of the substrate with the rough coating or the particles produced according to the invention, while other areas of the substrate are not coated.

It is generally possible to achieve a surface having desired matte or shiny effects in certain areas by adjusting the surface density (number of particles per unit surface area) and/or the particle size. Gradients of the degree of matting or haptic effects can generally be produced in a simple manner by means of corresponding control of the print heads and thus by means of laterally varying surface densities and/or particle sizes.

By suitably selecting the coating materials and the coating parameters, the type of haptic effect can be influenced. Haptics can be varied from sand lacquer or sandpaper effects to soft touch properties. By controlling the thickness of the layer, these properties can be enhanced by imparting an additional relief. The term 'sand lacquer' refers to a textured lacquer that shows a structure and feel similar to that of sandpaper. It is also possible to chemically functionalize the surfaces, as is known for example from first to third-generation Ormocer treatment.

By selecting suitable materials, the invention can also be used to produce sealable areas. For example, the particles can be configured in a hot-meltable form for this purpose. Thermal post-crosslinking is also conceivable.

In a further embodiment, the flight time of the droplets from ejection from the print head to impact on the substrate is a maximum of 10 ms, preferably a maximum of 5 ms, and particularly preferably less than 1.5 ms. If the interval between the print heads and the surface to be coated is small, the flight time can also be significantly less. In particular, the flight time can also be less than 0.5 ms. Even these brief flight times make it possible to achieve sufficient curing of the particles during flight, so that dimensionally stable polymer particles and/or polymer particles having a dimensionally stable covering are obtained. According to another embodiment of the invention, however, the flight time is less than 0.05 ms.

According to an embodiment of the invention, the droplets formed in step b) show a velocity of 0.5 to 14 m/s, preferably 1 to 12 m/s, and particularly preferably 3 m/s to 8 m/s.

According to another embodiment of the invention, the droplet size and formation of satellites, and in general the type of droplet formation and thus the shape and size of the particles formed from the droplets, can be affected by adjusting the shape of the electrical pulse used to control the nozzles. The pulse shape can also be adjusted in a way that a plurality of droplets approximately equal in size, rather than a single large droplet, can be produced per pulse. This can be advantageous for the invention in order to produce small particles.

Piezo jet nozzles are preferably used for the invention. In the case of such nozzles, an electrical pulse causes deformation of a piezoelectric material, and thus a sound or pressure wave, which causes the coating material to be ejected in the form of droplets. The pulses are produced by a control device, and are typically computer-controlled.

The flight time of the droplets may be set by adjusting velocity of the droplets and the interval between the print head and the substrate. Moreover, the pressure and velocity can affect the shape of the droplets and thus the shape of the cured particles. For example, high velocity can result in deformation of the particles on impact on the substrate surface, and this effect can be significant, particularly in the case of partially cured particles having a low degree of curing. Moreover, particularly in the case of droplets or particles that have a low degree of curing, the shape thereof may be affected by the surface tension of the droplet, the degree of curing of the surface, or interactions between droplets and the substrate (such as hydrophobic or hydrophilic interactions).

In a preferred embodiment of the invention, the substrate prepared in step a) shows a second curable coating. The second coating contains a third prepolymer and/or a third monomer with a third polymerizable group and is not yet or at least not yet completely hardened. The second coating is cured only after the impact of the polymer particles produced in step b), so that the particles adhere after impact on the second coating. According to an embodiment of this embodiment, the second coating is cured in step c) by polymerization and/or crosslinking of the third polymerizable group. Another embodiment provides for curing of the second coating by reacting the third polymerizable group in a step e) following step d).

Curing of the second coating with the third prepolymer or monomer after the impact of the particles provides improved adhesion of the polymer particles to the coated substrate. This allows the second coating with the third prepolymer or monomer to be used as an adhesion intermediary or adhesion promoter.

In an embodiment of the invention, the fluid preparation for processing with ink jet nozzles contains a prepolymer which, in addition to the first polymerizable group, has at least one second polymerizable group, with the first and second polymerizable groups not being identical and the second polymerizable group being inert or largely inert with respect to the polymerization conditions of the first group. In particular, the second polymerizable group causes crosslinking of the prepolymer chains. In an embodiment of the invention, the first polymerizable group reacts during flight and thus causes curing of the droplet. As the second polymerizable group does not react or reacts only to a minimal extent under the corresponding reaction conditions, these groups are available for crosslinking of the deposited coating. By means of a reaction of the second polymerizable groups, for example, crosslinking of the polymers among one another can take place in a following process step. Based on the degree of polymerization of the second polymerizable groups, coating properties such as the porosity of the coating or its abrasion resistance can thus be set.

In an embodiment of the invention, the second polymerizable groups are configured such that surface functionalization of the particles can be carried out in a further process step. Specifically, the second polymerizable group may comprise an anchor group for selective chemical reactions. In this embodiment, the coating may have sensor and/or indicator properties, for example.

Alternatively or additionally, the fluid preparation for processing with ink jet nozzles can also contain a monomer having a first and second polymerizable group, with the first and second polymerizable groups not being identical and the second polymerizable group being inert or largely inert under the polymerization conditions of the first group. In this embodiment of the invention, the particles deposited on the substrate can therefore be cured and/or mutually crosslinked in a following step.

Alternatively or additionally, a coated substrate having a third polymerizable group according to the above-described embodiment of the invention can be prepared in step a). In this embodiment, both the second and the third polymerizable groups are polymerized in step e). The second and third polymerizable groups can be different or identical functional groups. In particular, the second and third polymerizable groups are configured in such a way that polymerization and/or crosslinking reactions between the second and the third polymerizable groups can occur. By means of simultaneous polymerization of the second and third polymerizable groups, covalent bonding of the particles to the coated substrate may occur.

According to an embodiment of the invention, steps c) and d) are repeated on partial areas of the coated substrate in order to obtain a three-dimensional textured rough coating.

Such three-dimensional structures can also be produced using a coating process in which so many particles per unit surface area are applied that the particles are at least partially deposited on one another.

Moreover, the invention also concerns a printed or printable substrate with a first rough polymeric coating, with the coating being composed of polymeric, and specifically spherical or largely spherical shaped particles.

The polymer particles of the coating may be fully or partially cured. According to an embodiment, the particles show different degrees of curing in different areas. In this embodiment in particular, the degree of curing at the surface of the particles and/or in areas near their surface is greater than in the center of the particles. In other words, the degree of curing may show a gradient depending on the radius as a function of radiation dose, wavelength, particle size, et cetera. In this manner, a rough coating can be obtained in which the particles have a solid shell and a fluid adhesive core. These particles may be configured in such a way that the shell shatters on application of force and the interior of the particle is released. Such coatings can be used, for example, as multicomponent systems and/or in joining technology (PSA, pressure-sensitive adhesives). Strong adhesion can then be obtained by again curing the released coating material, resulting in post-crosslinking.

In particular, the particles of the coating show an average volume of 0.01 to 500 pL, preferably 0.1 to 150, and particularly preferably 0.1 to 25 pL.

According to an embodiment, the rough coatings can be porous. In this case, the porosity of the coating can be adjusted by means of the particle size or particle volume.

Depending on the porosity of the rough coatings, they can be used, for example, as membranes, for example, semipermeable membranes, or filters.

The particles of the coating may be mutually crosslinked. By means of this crosslinking of the particles, the strength of the rough coating can be adjusted, with it being possible to carry out crosslinking chemically, but also physically. In addition, crosslinking of the particles within the coating reduces porosity. These rough coatings can be used as nonslip coatings.

In another embodiment, the particles of the coating show only minimal adhesion to one another and/or a minimal adhesion to the substrate. For example, this can cause a situation in which, when force is applied, particularly by friction, the particles separate from the substrate, thus increasing slidability. This allows the coatings to be used as micro bearings.

Fixed binding of the particles can also significantly increase slidability.

Because they protrude from the surface, the applied particles act as spacers. In this manner, adhesion of the otherwise highly smooth coating surfaces to each other is prevented by the so-called glass plate effect. If the particles are used in a low concentration, their presence in the coating has little or no effect on the material/mechanical or physical properties of the coating, such as the degree of gloss. The effect can be achieved by the method according to the invention in that only a few particles per unit surface area are applied to a substrate or in a coating. The percentage of particles on the surface required to achieve this effect is less than 10%, and preferably less than 5%.

Surface percentages of a maximum of 1% are particularly preferred in order to achieve a sliding effect. If the surface percentage is high, although the particles function as spacers, the contact surface increases and the degree of gloss decreases (matting). Surface percentages of less than 0.5% are most particularly preferred. The sliding effect can also remain effective down to extremely low surface percentages of 0.01%, and preferably 0.05%. It is particularly advantageous to position the spacers in a targeted manner on the surface of the coating. This obviates the need for a high concentration of particles in the volume of the coating materials.

In an embodiment of the invention, additional pigments and/or colorants are mixed with the polymer particles. This may provide the coating in some areas with differing particles and/or colorants. Alternatively and/or additionally, Metallur pigments are added to the particles and/or to an optionally present additional coating. This makes it possible to achieve metallic effects. The use of thermochromic pigments is also possible. Corresponding coatings can be used as decorative layers.

Alternatively or additionally, the polymer particles may contain substances or particles with special physical properties, for example, magnetic particles and/or conductive particles, so that the rough coatings show corresponding physical properties. These properties may of course be combined.

In a further embodiment of the invention, a second polymer layer to which the particles adhere is applied between the substrate and the rough coating.

The second polymer coating increases the adhesion of the particles to the substrate and can be configured as an adhesion-transferring or adhesion-strengthening layer. According to an embodiment, the first, that is, the rough layer, and the second layer are at least partially crosslinked at their interface.

In an embodiment of the invention, the polymer particles of the rough coating have surface functionalization, particularly surface functionalization by means of hydrophilic or hydrophobic groups.

Moreover, the invention concerns a device for the production of a rough coating on a substrate by means of ink jet printing. Already printed or printable substrates, such as printed products in particular, are preferred. The inventive device comprises a print head and at least one light source, preferably a UV and/or UV-VIS light source, with the print head being configured to emit a curable fluid preparation for processing with ink jet nozzles in the form of droplets. In particular, the print head is configured to emit individual droplets that are separate from one another. The light source is positioned in such a way that the emitted droplets are at least partially cured by the light emitted from the light source before impact on the substrate, which is at a distance from the print head, and then strike the substrate as particles.

In an embodiment of the invention, the device also comprises a coating device for the application of a second fluid, curable, polymeric coating and a transport device for moving the substrate past the coating device and the print head, so that the particles ejected from the print head and at least partially cured particles impact the fluid coating applied by the coating device. Moreover, the device comprises a second light source for curing the second fluid coating with the polymer particles applied thereto, which form a rough coating.

The distance from the print head should preferably be 1 to 5 mm, and particularly preferably 1 to 3 mm. With these distances, sufficient resolution and positional accuracy in the printing process is guaranteed. At the same time, the resulting flight time of the droplets allows sufficient curing of the drop-shaped fluid preparation for processing with ink jet nozzles during flight.

In particular, the print head is configured to eject droplets with a volume in the range of 0.01 to 500 pL, preferably up to 0.1 to 150 pL, and particularly preferably up to 0.1 to 25 pL. The diameter of the droplets of the particles is calculated in accordance with the volumes. In an embodiment of the invention, the device comprises a plurality of light sources. In this case, at least one light source comprises optical fibers or a laser source, the light-emitting ends of which are configured so that the light irradiates the area between the print head and the substrate. It is preferable to have at least one light source arranged in such a manner that the light source emits the radiation vertically at an angle ranging from perpendicular to parallel to the fall direction of the droplike emitted fluid preparation for processing with ink jet nozzles. In any case, it must be ensured that the light beams do not strike the print head used, as otherwise the fluid preparation would polymerize in the nozzle openings of the print head, thus potentially blocking the nozzles. Irradiation transverse to the direction of falling or the flight direction, or lateral irradiation, is particularly preferred, as this makes it easier to engage the light in the area in front of the nozzles. It is even more preferred to shine the light in a direction along a series of nozzles, that is, in a linear configuration of many nozzles. In other words, a light source is used that emits light transversely to the direction of the droplet flight and along a series of a plurality of spaced nozzles.

In a preferred embodiment, a laser scanner is used in which the laser beam specifically senses or scans the nozzles so that the droplets can preferably be struck in a targeted manner by the laser beam. In other words, a scanner can be used to successively move the laser beams to the respective nozzles that have just ejected droplets.

Efficient curing of the droplets can also be achieved with a laser beam irradiated parallel to the series of nozzles. In this case, the laser beam is correspondingly directed along a row of several spaced nozzles.

Alternatively or cumulatively, a pulsed laser, or a pulse laser, can be used, in which the laser beam is pulsed and in particular is synchronized with drop ejection and can therefore lead to particularly rapid curing during droplet flight because of the extremely high light intensities achievable with pulsed layers.

In a further embodiment, a light source or both light sources used are replaced by electron beam devices, so that the droplets, and optionally the layer already present on the surface as well, or the entire coating composed of the particles and the optionally already present coating on the substrate, can all be cured by electron beam irradiation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
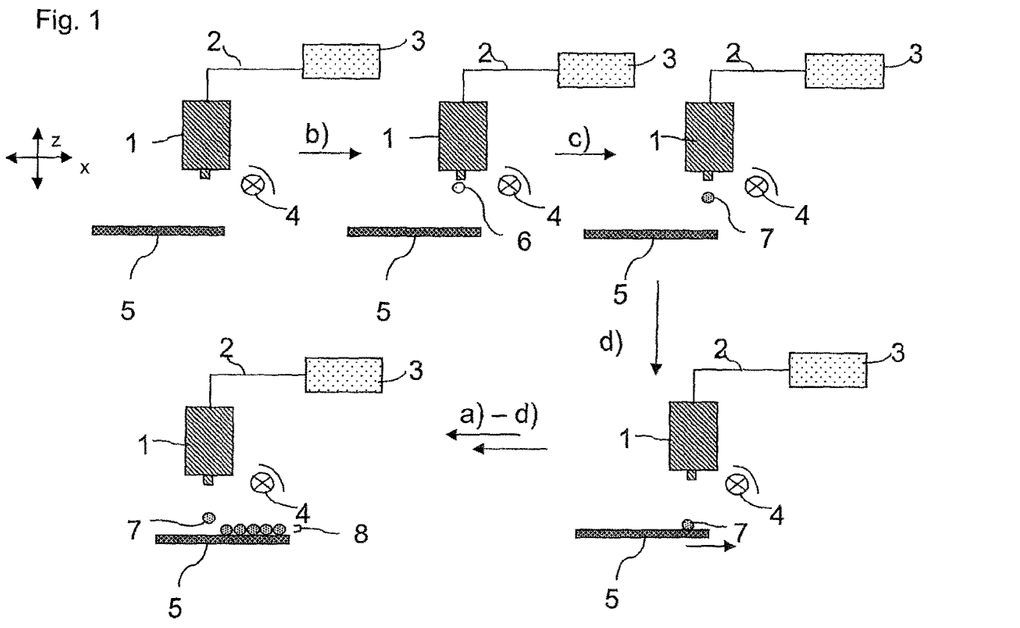
FIG. 1 is a schematic representation of a first embodiment of the production method according to the invention.

FIG. 1 shows a schematic representation of an embodiment of the production method according to the invention in which the partially cured particles 7 are deposited as a rough coating 8 on a substrate 5. For this purpose, a substrate 5 is first prepared. The substrate is positioned at a fixed interval below an ink jet print head 1 which is connected via a line 2 to a reservoir 3 containing the fluid preparation for processing with ink jet nozzles. Moreover, a light source 4 is positioned in such a way that the radiation emitted from the light source 4 is incident on the interval between the print head 1 and substrate 5 (step a). The print head 1 ejects the fluid preparation for processing with ink jet nozzles in the form of individual droplets 6 that fall onto the substrate 5 (step b). During the flight of the droplet 6 through the radiation emitted by the light source 4, it is at least partially cured (step c), so that the at least partially cured droplets or particles 7 strike the substrate (step d). By suitably selecting the form of the control pulse with which the nozzle, preferably a piezo jet nozzle, is activated, it is possible to eject a plurality of droplets per pulse rather than individual droplets. This corresponds to a certain extent to spraying the fluid preparation for processing with ink jet nozzles through the ink jet nozzle. This is particularly favorable for producing small particles.

According to an embodiment of the invention, the light source can also be operated in a pulsed manner. In this process, the emission of light is preferably synchronized with droplet ejection so that the light pulse strikes the droplets in flight. The light source can comprise one or a plurality of light-emitting diodes operated in pulsed mode. In particular, it is also possible to use a pulse laser as a light source 4. Particularly in the case of low pulse frequencies, it is advisable to synchronize the emission of the laser pulse with the drop ejection in order to strike the droplets in flight with a laser pulse. According to another embodiment of the invention, a scanner can also be provided with which the light beam from the light source 4 can be directed onto the respective drop ejection area between the nozzle and the substrate, which is transversed by the ejected droplets. Both embodiments are favorable, among other reasons, because the total amount is reduced, thus reducing the risk that the curable fluid preparation will undergo curing at or in the nozzles 9.

The substrate 5 is moved in the x direction relative to the print head, and the steps a) to d) are repeated so that the individual particles 7 on the substrate 5 form a rough coating 8.

Figure 2:
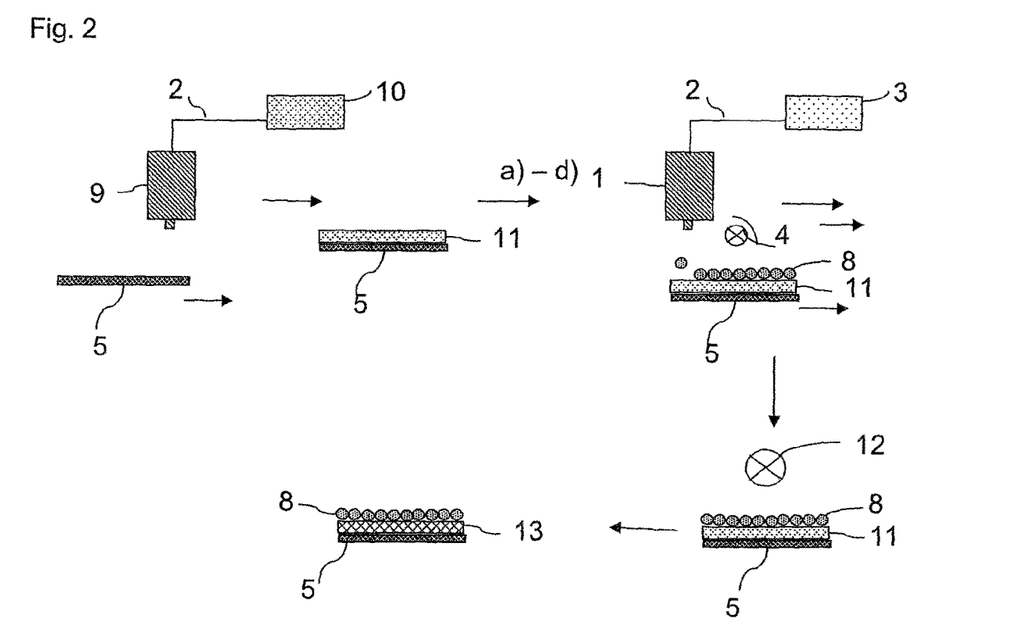
FIG. 2 is a schematic representation of a second embodiment of the production method according to the invention.

In the embodiment of the invention shown in FIG. 2, a fluid curable coating 11 is first deposited on the substrate 5 by means of a print head 9 as a second coating. The print head 9 is connected via a line 2 to a reservoir 10 for a coating preparation. In this case, the coating preparation may differ from the fluid preparation for processing with ink jet nozzles, which does not rule out processability of the corresponding coating preparation with ink jet nozzles.

After this, a rough coating 8, analogously to the process shown in FIG. 1, is deposited on the substrate 5 coated with the fluid curable coating 11. After this process step, the coated substrate 5 shows a coating with a fluid, curable layer 11 and a rough particulate layer 8 as the first coating. In a subsequent process step, the layer 11 is cured by the radiation emitted by the light source 12 and is thus converted into the cured layer 13. In this process, the rough layer 8 is also fully cured, provided that complete curing in flight has not already taken place.

Figure 3:
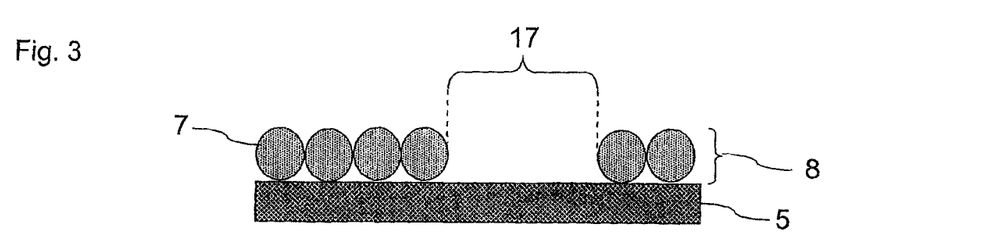
FIG. 3 is a schematic representation of a rough coating on a substrate according to the invention.

FIG. 3 shows a schematic representation of a substrate 5 with a rough coating 8 wherein the rough coating 8 is composed of individual polymer particles 7. Because of the spherical or at least largely spherical shape of the polymer particles 7, the coating 8 is a rough coating, or a rough feel can optionally be produced. In addition, the coating 8 is porous because of its particle shape and the packing density of the particles resulting therefrom, with the porosity of the coating 8 being dependent on the particle size and/or the degree of mutual polymerization of the particles.

In general, without restricting the example shown in FIG. 3, the invention is particularly suitable for producing lateral textured coatings with gaps in areas of the surface. FIG. 3 shows a gap area 17. Such areas not provided with particles may also be present in all of the embodiments described below. In this manner, for example, certain areas of the surface may be imparted a rough feel.

Figure 4:
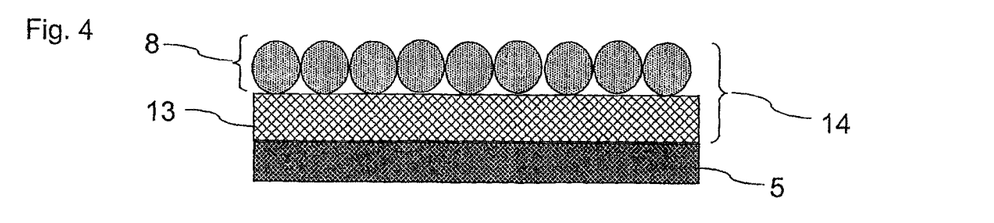
FIG. 4 is a schematic representation of an embodiment of the coated substrate according to the invention in which the substrate also has a second coating.

FIG. 4 is a schematic representation of an embodiment of the invention in which the substrate 5 is covered with a coating 14. The coating 14 shows two partial layers 13 and 8, with the partial layer 13 being located between the rough partial layer 8 and the substrate 5. This type of product can be produced by applying to the substrate a coating containing a third prepolymer and/or a third monomer with a third polymerizable group. A second coating is then applied, with the second coating not being completely cured before the impact of the droplets, and the coating is cured in such a way after impact of the droplets that the droplets adhere to the coating.

In general, with the embodiment shown not constituting any limitations, it is advantageous if the thickness of the partial layer 13 is selected to be less than the diameter of the particles in order to prevent the particles from sinking completely into the partial layer 13. The diameter D of the particles is determined according to the following equation $$D = 2\sqrt[3]{\frac{3V}{4\pi}}$$

from the volume V of the particles. For example, a particle with a volume of 6 pL has a diameter of 22.5 μm. Optionally, however, the layer thickness of the partial layer 13 may also be larger if no sinking of the particles 7 occurs.

Figure 5:
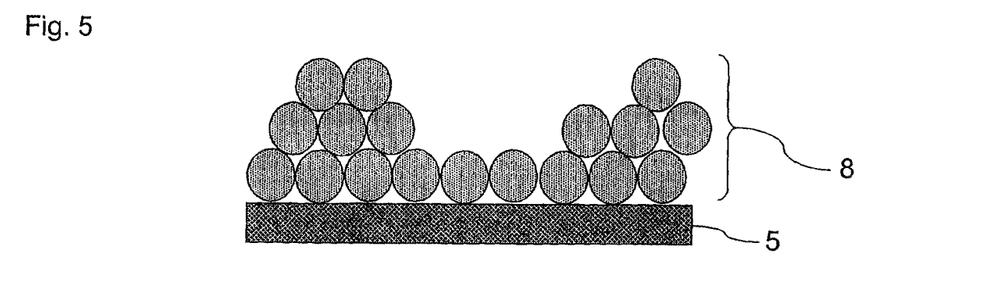
FIG. 5 is a schematic representation of an embodiment of the coated substrate according to the invention, in which the rough coating shows a plurality of partial layers in some areas.

FIG. 5 shows a schematic representation of a further embodiment of the coated substrate according to the invention in which the rough coating 8 shows a plurality of partial layers in some areas. This makes it possible to show three-dimensional structures on the substrate, or optionally, the layer thickness of the rough layer can be greater than the diameter of the particles 7.

Figure 6:
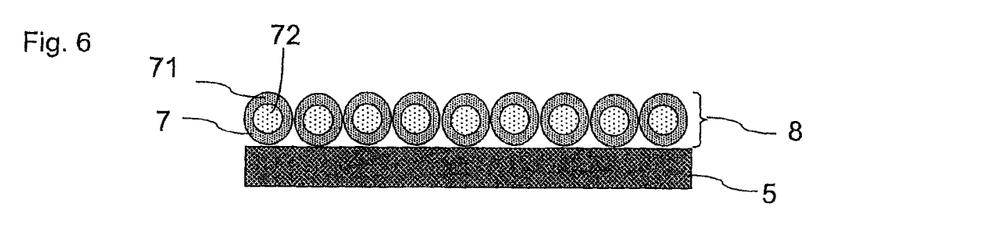
FIG. 6 and FIG. 7 are schematic representations of two further embodiments of the coated substrate according to the invention in which the rough coating has differing degrees of curing in various partial areas.

FIG. 6 schematically shows a further embodiment of a substrate 5 with a rough coating 8. In this embodiment, particles 7 of the rough coating 8 show partial areas 71 and 72 having various degrees of curing. Here, the degree of curing in the partial area close to the surface 71 is higher than the degree curing in the internal partial area 72. The external partial area 71 therefore forms the solid shell of the particles 7 and gives them dimensional stability, while the inner partial area 72 of the particles shows low viscosity. This type of coating can also be used as a pressure-sensitive adhesive layer if the inner partial area 72 is suitable for adhesion and the particles 7 release the fluid contained therein under mechanical pressure.

Figure 7:
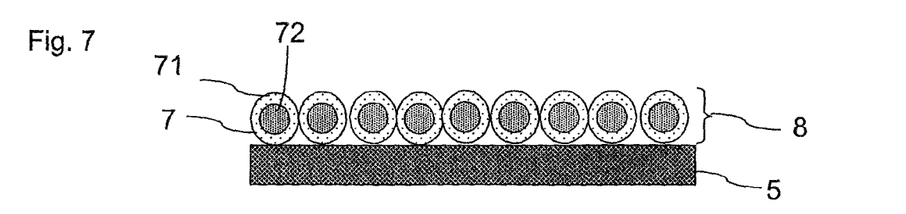

FIG. 7 is a schematic representation of a further embodiment of a substrate 5 with a rough coating 8. In this embodiment, the particles 7 of the rough coating 8 have partial areas 71 and 72 with different degrees of curing. The degree of curing in the partial area 71 close to the surface is lower than the degree of curing in the inner partial area 72. The outer partial area 71 of the particles 7 provides them with adhesiveness, while the inner partial area 72 of the particles has a higher viscosity.

Figure 8:
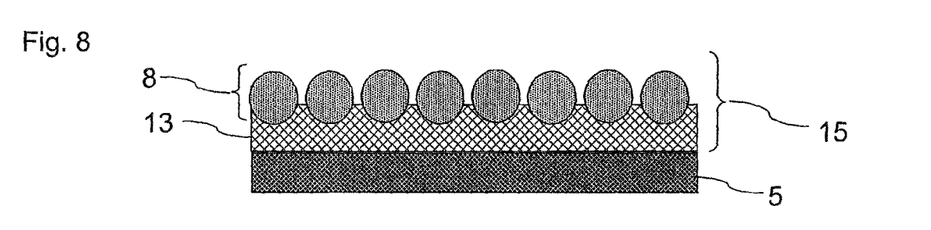
FIG. 8 is a variant of the embodiment shown in FIG. 5.

FIG. 8 shows an embodiment of the invention in which the substrate 5 is coated with a coating 15. The coating 15 has two partial layers 13 and 8, with partial layer 13 arranged between the rough partial layer 8 and the substrate 5 and partial layer 8 partially embedded in partial layer 13. FIG. 8 shows a variant of the embodiment shown in FIG. 5 in which the particles 7 are partially sunken into the previously applied partial layer 13. In this case, an application of the embodiments according to FIGS. 3 to 8 can also be the production of reflecting layers. The reflecting layer is formed by the essentially spherical particles. If the partial layer 13 in the embodiment shown in FIG. 8 is reflective, this produces a highly efficient reflector layer.

Figure 9:
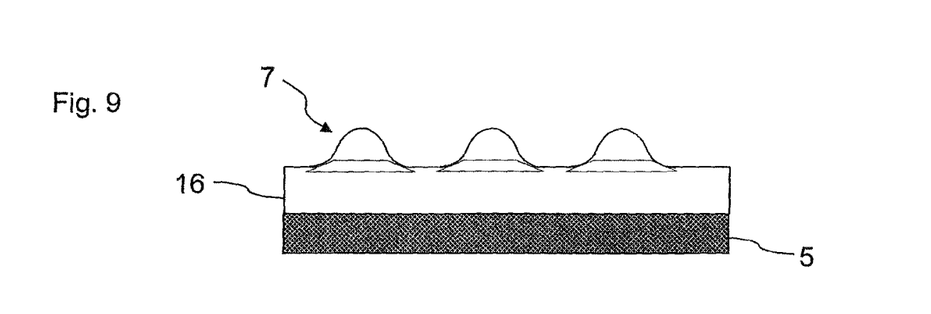
FIG. 9 is an embodiment of the invention with partially merged particles.

FIG. 9 shows an embodiment of the invention in which the substrate 5 has a coating 16 with surface particles 7 that are also spherical or convex, with the transitions from the particles 7 to the flat areas of the coating surface being concave. In other words, the particles are partially merged with the coating. Without any restriction of the scope of this special embodiment, a coating can be produced in which the droplets are only partially cured during flight and land on an uncured or only partially cured coating. The contact angle of the droplets can be influenced by varying the surface tension of the droplets and the surface. Depending on the surface tension of the materials involved, the particles 7 can also be completely encased or covered by the coating. This form of the particles 7 on the surface can also be achieved in the embodiment shown in FIG. 8 if, because of the differences in surface tension of the materials of the particles 7 and the partial layer 13, the coating material of the partial layer 13 wets the particles 7.

The particles and the coating are then completely cured together.

It is understood that the foregoing description is that of the preferred embodiments of the invention and that various changes and modifications may be made thereto without departing from the spirit and scope of the invention as defined in the appended claims.

What is claimed is:

1. A method for producing rough polymeric coatings, which comprises:
   providing a fluid preparation comprising at least one member selected from the group consisting of: a prepolymer, an oligomer, a monomer, and a reactive diluent, or a mixture thereof, and further comprising at least one photoinitiator, wherein the at least one member comprises at least a first polymerizable group that is radically polymerizable;
   ejecting a droplet of the fluid preparation from a nozzle of an ink jet print head in response to an electrical signal;
   irradiating the droplet in flight with a radiation source;
   at least partially polymerizing the fluid preparation to form polymer particles before impact or collection; and
   producing a coating comprising two partial layers, wherein the polymer particles form a second rough partial layer partially sunk into a previously applied first partial layer;
   wherein the fluid preparation comprises a first polymerizable group and a second polymerizable group,
   wherein the fluid preparation comprises the monomer, the prepolymer, and/or the oligomer and the monomer, the prepolymer and/or the oligomer comprise the first polymerizable group and the second polymerizable group
   wherein the second polymerizable group is inert with respect to polymerization conditions of the first polymerizable group; and,
   wherein the first polymerizable group is polymerized in flight and the second polymerizable group is polymerized subsequently after polymerization of the first polymerizable group.

2. The method as claimed in claim 1, wherein the radiation source emits light in the UV-VIS range.

3. The method as claimed in claim 1, wherein the rough coating is applied in a laterally textured manner.

4. The method as claimed in claim 1, wherein a flight time of the droplet is less than or equal to 10 ms.

5. The method as claimed in claim 1, wherein the droplet has a velocity of 0.5 to 14 m/s.

6. The method as claimed in claim 1, wherein irradiating the droplets in flight is performed repeatedly so that a three-dimensional textured coating is obtained.

7. The method according to claim 1, wherein the polymer particles have an average volume of 0.1 to 25 pL.

8. A method for producing rough polymeric coatings, which comprises:
   providing a fluid preparation comprising at least one member selected from the group consisting of: a prepolymer, an oligomer, a monomer, and a reactive diluent, or a mixture thereof, and further comprising at least one photoinitiator, wherein the at least one member comprises at least a first polymerizable group that is radically polymerizable;
   ejecting a droplet of the fluid preparation from a nozzle of an ink jet print head in response to an electrical signal;
   irradiating the droplet in flight with a radiation source;
   at least partially polymerizing the fluid preparation to form polymer particles before impact or collection; and
   producing a coating comprising two partial layers, wherein the polymer particles form a second rough partial layer partially sunk into a previously applied first partial layer;
   wherein the fluid preparation comprises a first monomer, a first prepolymer and/or a first oligomer and a second monomer, a second prepolymer and/or a second oligomer,
   wherein the first monomer, the first prepolymer and/or the first oligomer comprise the first polymerizable group,
   wherein the second monomer, the second prepolymer and/or the second oligomer comprise a second polymerizable group,
   wherein the second polymerizable group is inert with respect to polymerization conditions of the first polymerizable group; and wherein the first polymerizable group is polymerized in flight and the second polymerizable group is polymerized subsequently after polymerization of the first polymerizable group.

9. The method as claimed in claim 8, wherein a radiation source is used that emits light in the UV-VIS range.

10. The method as claimed in claim 8, wherein the coating is applied in a laterally textured manner.

11. The method as claimed in claim 8, in which a flight time of the droplet is less than or equal to 10 ms.

12. The method as claimed in claim 8, wherein the droplet has a velocity of 0.5 to 14 m/s.

13. The method as claimed in claim 8, wherein the second polymerizable group and a third polymerizable group are simultaneously polymerized.

14. The method as claimed in claim 8, wherein irradiating the droplet in flight is performed repeatedly so that a three-dimensional textured coating is obtained.

15. The method according to claim 8, wherein the polymer particles have an average volume of 0.1 to 25 pL.

* * * * *